United States Patent
Dejima et al.

(10) Patent No.: US 6,908,951 B2
(45) Date of Patent: Jun. 21, 2005

(54) EXPANDABLE COATING COMPOSITION, COATED PRODUCT, AND PRODUCTION METHOD FOR EXPANDED COATING FILM

(75) Inventors: Hiroya Dejima, Kitakatsushika-gun (JP); Hiroyuki Kai, Kitakatsushika-gun (JP); Kenji Kawazu, Nagoya (JP)

(73) Assignees: Fujikura Kasei Co., Ltd., Tokyo (JP); Toyota Jidosha Kobushiki Kaisha, Aichi-ken (JP)

( * ) Notice: Subject to any disclaimer, the term of this patent is extended or adjusted under 35 U.S.C. 154(b) by 113 days.

(21) Appl. No.: 10/395,946

(22) Filed: Mar. 24, 2003

(65) Prior Publication Data

US 2003/0191207 A1 Oct. 9, 2003

(30) Foreign Application Priority Data

Apr. 8, 2002 (JP) ........................................ 2002-105628

(51) Int. Cl.$^7$ .............................................. C08L 75/04
(52) U.S. Cl. ..................... 521/137; 521/130; 521/170; 521/174
(58) Field of Search ................................. 521/130, 137, 521/170, 174

(56) References Cited

U.S. PATENT DOCUMENTS

| | | | |
|---|---|---|---|
| 3,615,972 A | * 10/1971 | Morehouse et al. | 156/79 |
| 4,303,736 A | * 12/1981 | Torobin | 428/403 |
| 5,260,343 A | * 11/1993 | Harrison et al. | 521/51 |
| 6,166,109 A | * 12/2000 | Spitler et al. | 523/218 |
| 6,287,638 B1 | * 9/2001 | Castelli et al. | 427/381 |

FOREIGN PATENT DOCUMENTS

| | | |
|---|---|---|
| EP | 1 172 388 A1 | 1/2002 |
| JP | HEI 03-046030 | 7/1991 |
| JP | HEI 05-031457 | 2/1993 |
| JP | 08-193111 | 7/1996 |
| JP | HEI 10-095062 | 4/1998 |
| JP | 2001-152078 | 6/2001 |
| JP | 2001-234120 | 8/2001 |

* cited by examiner

*Primary Examiner*—John M. Cooney, Jr.
(74) *Attorney, Agent, or Firm*—Scully, Scott, Murphy & Presser

(57) ABSTRACT

An expandable coating composition, yields a coating film having elasticity, a soft feeling, and strength which are sufficient for an instrument panel of an automobile by simple processes. An expandable coating composition yields an expanded coating film and contains (a) a polyol compound, (b) an isocyanate compound, and (c) water; the (a) polyol compound reacts with a part of the (b) isocyanate compound, thereby yielding polyurethane resin; the remaining (b) isocyanate compound reacts with the (c) water, thereby yielding carbon dioxide; the polyurethane resin has a breaking strength of 5 N/cm$^2$ or greater and less than 200 N/cm$^2$ in a case in which an elongation percentage thereof is 100% or less; and the polyurethane resin has a breaking strength of 5 N/cm$^2$ to 1,500 N/cm$^2$ in a case in which an elongation percentage thereof is more than 100%.

6 Claims, No Drawings

EXPANDABLE COATING COMPOSITION, COATED PRODUCT, AND PRODUCTION METHOD FOR EXPANDED COATING FILM

BACKGROUND OF THE INVENTION

1. Field of the Invention

The present invention relates to an expandable coating composition, a coated product comprising an expanded coating film, and a production method for an expanded coating film, which are suitably used for an instrument panel provided in an automobile, for example.

2. Description of the Related Art

In order to improve design characteristics and protect the surfaces of objective products, many coatings have been applied to the objective products. In recent years, the development of coatings, which can apply many kinds of design characteristics and functional characteristics, has been desired.

For example, since an elastic coating has a soft feeling and a luxurious feeling, in addition to safety, interior materials, such as an instrument panel provided in an automobile, sometimes require elastic coatings. For example, Unexamined Japanese Patent Application, First Publication No. Hei 05-031457 discloses a production method for a coated product, in which an expandable coating composition containing a synthetic resin binder comprising a polyol compound, an isocyanate compound, and water, hollow particles, and a curing catalyst is coated on an objective product.

In addition, Unexamined Japanese Patent Application, First Publication No. Hei 10-095062, discloses a decorative material having a suede tone appearance in which thermal expanded microcapsules are dispersed in a synthetic resin.

However, a production method disclosed in Unexamined Japanese Patent Application, First Publication No. Hei 05-031457 often produces a coating film having insufficient elasticity and soft feeling. In addition, in order to improve elasticity, hollow particles are used in this production method. However, since hollow particles have a low specific gravity, hollow particles come to the surface of the expandable coating composition during use and storage. As the result, the expandable coating composition sometimes cannot impart a desired soft feeling to the expanded coating film.

The method disclosed in Unexamined Japanese Patent Application, First Publication No. Hei 10-095062, requires an expanding step in high temperatures for expanding microcapsules. Therefore, the method requires a great deal of time, and it cannot produce a coating film having a sufficient smoothness.

Therefore, an object of the present invention is to provide an expandable coating composition, a coated product, and a production method for an expanded coating film, which can provide a coating film having sufficient elasticity, soft feeling, and strength for an instrument panel of an automobile by simple processes.

SUMMARY OF THE INVENTION

In order to achieve the object, the present inventors noticed a relationship between an elongation percentage and a breaking strength of polyurethane resin, in particular. As the result, the present inventors found that the object can be achieved by using specific polyurethane having the relationship in a fixed range.

That is, in order to achieve the object, the present invention provides an expandable coating composition which can produce an expanded coating film and which contains (a) a polyol compound, (b) an isocyanate compound, and (c) water; the (a) polyol compound reacts with a part of the (b) isocyanate compound, thereby yielding polyurethane resin; the remaining (b) isocyanate compound reacts with the (c) water, thereby yielding carbon dioxide; the polyurethane resin has a breaking strength of 5 $N/cm^2$ or greater and less than 200 $N/cm^2$ in a case in which an elongation percentage thereof is 100% or less; and the polyurethane resin has a breaking strength of 5 $N/cm^2$ to 1,500 $N/cm^2$ in a case in which an elongation percentage thereof is more than 100%.

According to the expandable coating composition, it is possible to provide a coating film having sufficient elasticity, soft feeling, and strength for an instrument panel of an automobile, for example.

In the expandable coating composition, it is preferable to contain elastic solid particles.

According to the expandable coating composition, it is possible to provide a coating film having a further improved elasticity.

In addition, in order to achieve the object, the present invention provides a coated product comprising an expanded coating film obtainable from the expandable coating composition.

The coated product has sufficient elasticity, soft feeling, and strength for an instrument panel of an automobile, for example.

Furthermore, in order to achieve the object, the present invention provides a production method for an expanded coating film comprising the steps of: coating an expandable coating composition containing (a) a polyol compound, (b) an isocyanate compound, and (c) water; reacting the (a) polyol compound with a part of the (b) isocyanate compound, thereby yielding polyurethane resin, the polyurethane resin has a breaking strength of 5 $N/cm^2$ or greater and less than 200 $N/cm^2$ in a case in which an elongation percentage thereof is 100% or less and the polyurethane resin has a breaking strength of 5 $N/cm^2$ to 1,500 $N/cm^2$ in a case in which an elongation percentage thereof is more than 100%; reacting the remaining (b) isocyanate compound with the (c) water, thereby yielding carbon dioxide.

According to the production method, it is possible to provide an expanded coating film having sufficient elasticity, soft feeling, and strength for an instrument panel of an automobile, for example, by simple steps.

In the production method, it is preferable for the expandable coating composition to contain elastic solid particles.

According to the production method, it is possible to provide an expanded coating film having a further improved elasticity.

DETAILED DESCRIPTION OF THE PREFERRED EMBODIMENTS

Below, the present invention will be explained with reference to preferred embodiments.

An expandable coating composition which can produce an expanded coating film of the present invention contains (a) a polyol compound, (b) an isocyanate compound, and (c) water. The (a) polyol compound reacts with a part of the (b) isocyanate compound, thereby yielding polyurethane resin. The remaining (b) isocyanate compound reacts with the (c) water, thereby yielding carbon dioxide. Therefore, the expandable coating composition can produce an expanded coating film, in which bubbles made of carbon dioxide are present in polyurethane resin.

The (a) polyol compound includes, for example, polyether polyols having a weight average molecular weight (abbreviated as "Mw" below) of 400 to 7,000, which are obtained by hydroxylation of glycerin, sucrose, and amino compounds as raw materials by adding ethylene oxide, propylene oxide, and polyester polyols having a Mw of 500 to 4,000 which are obtained by esterification reaction between poly alcohol and polycarboxylic acid. These polyol compounds may be used individually or in combination of two or more thereof.

Commercial products of these polyol compounds include DESMOPHEN® 1150, SUMIPHEN® 3900, and SUMIPHEN® 5200 (marketed by SUMITOMO BAYER URETHANE CO., LTD), and NIPPORAN® 4042 and NIPPORAN® 4070 (marketed by NIPPON POLYURETHANE INDUSTRY CO., LTD). Polyurethane resin having required elongation percentage and breaking strength is obtained by selecting a suitable polyol compound among these compounds. These commercial products may be used individually or in combination of two or more thereof.

As the (b) isocyanate compound, any isocyanate compounds, which can react with the (a) polyol compound and produce polyurethane resin, can be used in the present invention. For example, the (b) isocyanate compound includes diphenylmethanediisocyanate compound, tolylenediisocyanate compound, xylenediisocyanate compound, hexamethylenediisocyanate compound, and the like.

When the (a) polyol compound reacts with the (b) isocyanate compound, polyurethane resin is obtained. In the present invention, it is required that the polyurethane resin has a breaking strength of 5 N/cm$^2$ or greater and less than 200 N/cm$^2$ in a case in which an elongation percentage thereof is 100% or less and the polyurethane resin has a breaking strength of 5 N/cm$^2$ to 1,500 N/cm$^2$ in a case in which an elongation percentage thereof is more than 100%. Therefore, the (a) polyol compound, which produces polyurethane resin having these properties, is selected in the present invention.

When breaking strength and elongation percentage of polyurethane resin are in these ranges, the expanded coating film, which are produced by the expandable coating composition containing such polyurethane resin, has elasticity and luxurious feeling and gives a suitable soft feeling to the touch. In addition, the expanded coating film has sufficient strength for preventing the generation of cracks and breakage. Therefore, in view of both design characteristics and safety, the expanded coating film is suitable for an instrument panel provided in an automobile.

When breaking strength and elongation percentage of polyurethane resin are measured, an expandable coating composition containing the (a) polyol compound, the (b) isocyanate compound, and a curing catalyst and the like, which are described below, if necessary, is coated On a release paper, maintained at 80° C. for 1 hour and thereby these compounds are reacted and the expandable coating composition is hardened, and a polyurethane film having a thickness of 100 to 150 μm is prepared. After leaving it for 24 hours, the polyurethane film is cut down and test pieces having a size of 1 cm×10 cm are prepared. Then, after leaving them at 20° C. for 5 hours, breaking strength and elongation percentage of the test pieces are measured using a universal testing machine. A universal testing machine TENSILON® RTC-1210 (marketed by Orientic Co., Ltd.) can be used.

When the expandable coating composition is coated on the surfaces of an objective product, and is maintained under certain conditions, the (a) polyol compound and a part of the (b) isocyanate compound are reacted and cured, and thus polyurethane resin is produced. Simultaneously, the remaining (b) isocyanate compound and the (c) water are reacted and generate carbon dioxide. As a result, the expanded coating film, in which bubbles made of carbon dioxide are present in polyurethane resin, is prepared.

The ratio between the (a) polyol compound and the (b) isocyanate compound in the expandable coating composition is preferably such that the amount of NCO group of the (b) isocyanate compound is 0.8 to 3.0 mol with respect to 1 mol of OH group of the (a) polyol compound.

In order to adjust elasticity of the expanded coating film, the expandable coating composition may contain elastic solid particles. When elastic solid particles are added to the expandable coating composition, not only bubbles but also elastic solid particles have restoring force against external forces and further improve elasticity of the expanded coating film. Elastic solid particles mean particles which are made of elastic material and are not hollow. When external force is applied to elastic solid particles, elastic solid particles are easily transformed. Therefore, elastic solid particles further improve elasticity of the expanded coating film. Moreover, hollow particles are easily broken by external force and cause faults in the coating film, and elasticity thereof is degraded. However, elastic solid particles do not cause these defects. Therefore, elastic solid particles are preferable. In addition, when elastic solid particles are added to the expandable coating composition, it is possible to adjust strength and smoothness of the expanded coating film. Specifically, smoothness, elasticity, and strength of polyurethane resin, which is relatively soft, are improved by adding elastic solid particles.

As elastic solid particles, resin beads are preferable. Preferable resin beads include, for example, urethane resin beads (specific gravity: about 1.2), silicone rubber beads (specific gravity: about 1.3), acrylic resin beads (specific gravity: about 1.1), and the like.

In addition, it is preferable for an average particle diameter of elastic solid particles to be 1 to 200 μm and for specific gravity thereof to be 0.8 to 2.0. When an average particle diameter of elastic solid particles is less than 1 μm, there is possibility that elastic solid particles cannot improve elasticity of the expanded coating film. In contrast, when it exceeds 200 μm, when the expanded coating film is extremely thin, there are cases in which smoothness and strength of the expanded coating film are degraded. When specific gravity of elastic solid particles is less than 0.8, when the expandable coating composition containing elastic solid particles is coated on an objective product, elastic solid particles come to the surface of the expanded coating film, and they accumulate near the surface of the expanded coating film. Thereby, there are cases in which characteristics such as leveling, appearance, and elasticity of the surface of the expanded coating film are degraded. In addition, when elastic solid particles having an extremely low specific gravity and a large average particle diameter, since the specific gravity per one elastic solid particle further reduces, these faults are easily generated. In contrast, when the specific gravity exceeds 2.0, there are cases in which elastic solid particles are precipitated and uniform mixing of the expandable coating composition is impossible.

Elastic solid particles are preferably added to the expandable coating composition so that 5 to 200 parts by mass of elastic solid particles are added with respect to 100 parts by mass of the (a) polyol compound. When the added amount of elastic solid particles is less than 5 parts by mass, there are cases in which the effects obtainable by adding elastic solid particles are not sufficiently obtained. In contrast, when it exceeds 200 parts by mass, there is a tendency for the strength of the expanded coating film to decrease.

The expandable coating composition may contain curing catalyst for improving the reaction rate between the (a) polyol compound and the (b) isocyanate compound, if necessary.

As the curing catalyst used in the present invention, a conventional curing catalyst can be used. The curing catalyst includes, for example, stannous octate, dibutyltindiacetate, dibutyltindilaurate, zinc stearate, triethyldiamine, ethylenediamine, N,N,N',N'-tetramethylhexane-1,6-diamine, N,N-dimethylcyclohexylamine, N,N,N',N'',N''-pentamethylpropylenetriamine, dimethylamino ethanol, N-ethylmorpholine, and the like.

The curing catalyst is usually added to the expandable coating composition so that 0.01 to 5.0 parts by mass of the curing catalyst is added with respect to 100 parts by mass of the (a) polyol compound. It is preferable to add 0.1 to 3.0 parts by mass of the curing catalyst. When the expandable coating film containing the amount within this range of the curing catalyst is coated on an objective product, the reaction degree between the (a) polyol compound and the (b) isocyanate compound, the curing degree, and the generation degree of carbon dioxide, which is generated by the reaction between the (b) isocyanate compound and the (c) water, are well balanced. As this result, the expanded coating film having suitable elasticity and a soft feeling, in which bubbles made of carbon dioxide are dispersed uniformly in polyurethane resin, can be obtained.

Among these curing catalysts, curing catalysts based on organic tin compounds are preferable. The curing catalysts based on organic tin compounds activate the (a) polyol compound, accelerate the reaction between the (a) polyol compound and the (b) isocyanate compound, and then cause a close-grained surface of the expanded coating film. In addition, it is more preferable to use 0.1 to 3.0 parts by mass of the curing catalyst based on organic tin compounds with respect to 100 parts by mass of the (a) polyol compound, together with other curing catalysts, such as ethylenediamine, and the like.

Furthermore, the expandable coating composition may contain a leveling agent and a foam stabilizer. Leveling agents and foam stabilizers such as silicone compounds, for example, polyether denatured dimethylpolysiloxane, polyether denatured methylalkylpolysiloxane are preferable. Among these compounds, the compounds, which prevent large decrease of surface tension of the expandable coating composition, such as silicone leveling additives BYK®-320, BYK®-325 (marketed by BYK-Chemie), foam stabilizers L-520, L-720 (marketed by Nippon Unicar Company Limited), are more preferable. The leveling agent and foam stabilizer are usually added to the expandable coating composition so that 0.05 to 10 parts by mass of the leveling agent and foam stabilizer is added with respect to 100 parts by mass of the (a) polyol compound. It is preferable to add 0.5 to 5 parts by mass of the leveling agent and foam stabilizer. When the expandable coating composition containing the amount within this range of the leveling agent and foam stabilizer is coated on an objective product, the expanded coating film, which has no surface defaults such as pinholes, a close-grained smooth surface, which hardly shrinks, and comprise sufficient number of bubbles made of carbon dioxide generated by the reaction, can be prepared.

In addition, the expandable coating composition may contain ordinary coating additives. Ordinary coating additives used in the present invention include, for example, coating viscosity regulating agents such as diluent, for example, organic solvent, and thickener, for example, thickener based on polyamide compound, cellulose thickener, organic bentonite, metallic soap; coloring agent such as pigment and dye; reinforcing agent such as inorganic fiber and organic fiber; anti-precipitation agent; and the like.

In order to coat the expandable coating composition on an objective product and prepare the expanded coating film, the expandable coating composition is produced by mixing the (a) polyol compound, the (b) isocyanate compound, the (c) water, and a curing catalyst, a leveling agent, a foam stabilizer, and coating additives, if necessary, and then the obtained expandable coating composition is coated immediately on the objective product.

Any coating methods can be adopted, for example, spray coating methods, flow coating methods, dipping methods, brush coating methods, or roll coating methods can be adopted. In addition, the coating thickness of the expandable coating composition is not particularly limited. However, since the final expanded coating film preferably has a thickness of 0.5 to 5 mm, the coating thickness of the expanded coating film is adjusted so that the final expanded coating film has such thickness. When the thickness of the expanded coating film is less than 0.5 mm, the expanded coating film does not have sufficient elasticity, and there are cases in which a sufficiently soft feeling cannot be obtained. In contrast, when it exceeds 5 mm, there is a tendency for coating at a uniform thickness to be difficult.

After coating, when the objective product is maintained at 20 to 80° C. for 3 to 30 minutes, the (a) polyol compound reacts with a part of the (b) isocyanate compound, thereby yielding polyurethane resin, together with the remaining (b) isocyanate compound reacting with the (c) water, thereby yielding carbon dioxide. Thereby, the expanded coating film, in which bubbles made of carbon dioxide are present in the polyurethane resin, is produced.

Moreover, before coating the expandable coating composition, a primer layer can be formed on the objective product. In addition, in order to apply other design characteristics to the expanded coating film, final coatings can be performed on the obtained expanded coating film.

The obtained coated product comprises the expanded coating film in which the (a) polyol compound reacts with a part of the (b) isocyanate compound, thereby yielding polyurethane resin, and the remaining (b) isocyanate compound reacts with the (c) water, thereby yielding carbon dioxide. In particular, the polyurethane resin has a breaking strength of 5 $N/cm^2$ or greater and less than 200 $N/cm^2$ in a case in which an elongation percentage thereof is 100% or less, and the polyurethane resin has a breaking strength of 5 $N/cm^2$ to 1,500 $N/cm^2$ in a case in which an elongation percentage thereof is more than 100%. This expanded coating film has elasticity and improved strength, and it gives a suitable soft feeling when to the touch, as well as a luxurious feeling. In view of both design characteristics and safety, this expanded coating film is suitable for an instrument panel provided in an automobile.

In addition, as described above, elasticity of the expanded coating film can be adjusted by adding elastic solid particles.

The production method for an expanded coating film of the present invention does not require a step in which the objective product is maintained at high temperatures such as 100° C. or greater, for example, after coating the expandable coating composition on the objective product. Therefore, according to the production method for an expanded coating film of the present invention, the expanded coating film having smoothness can be produced by simple processes.

Materials for the objective product are not limited; for example, the objective product made of plastic, metal, wood, ceramics, paper, and mixture thereof, can be used. In addition, any objective products may be used in the present invention. The objective products include, for example, interior and exterior materials for an automobile such as instrument panel, cushion materials, and elastic undercoating; domestic electrical instruments; building materials such as cushion materials and soundproof materials; house furnishings; business machines; and the like.

Below, the present invention will be explained in detail with reference to Examples.

EXAMPLE 1

Polyol compound (DESMOPHEN® 1150 marketed by SUMITOMO BAYER URETHANE CO., LTD; OH value: 155 mgKOH/g), isocyanate compound (diphenylmethanediisocyanate; NCO % (mass ratio of NCO): 33.6%), water, and curing catalyst (dibutyltindilaurate and ethylenediamine) were mixed in the proportions shown in Table 1 and an expandable coating composition was prepared. Moreover, the molar ratio between an OH group of the polyol compound and an NCO group of the isocyanate compound is 1.0.

The obtained expandable coating composition was coated uniformly on a base plate made of ABS so that the coating thickness was 100 μm. After leaving it at room temperature for 3 minutes, the base plate coated with the expandable coating composition was maintained at 80° C. for 1 hour, and thereby polyol compound reacted with a part of isocyanate compound and yielding polyurethane resin, together with the remaining (b) isocyanate compound reacting with water and yielding carbon dioxide. Thereby, an expanded coating film having a thickness of 500 μm was prepared.

After this, elasticity (a soft feeling) and strength of the obtained expanded coating film were measured by the following methods. The results are shown in Table 1.

Elasticity (Soft Feeling)

Observers touched the obtained expanded coating film by hand, and the elasticity (soft feeling) thereof was classified into three classes which are represented by the following symbols.

○: Observers sensed extremely large elasticity; that is, they felt that it was very soft Δ: Observers sensed low elasticity; that is, they felt that it was slightly hard X: Observers sensed hardly any elasticity; that is, they felt that it was hard Strength The obtained expanded coating film was scratched using an HB pencil for a strength test of a coating film. Then, whether or not tear marks were present was observed.

○: No tear mark present

X: Tear mark present

In addition, in order to measure elongation percentage and breaking strength of the obtained polyurethane resin, first, the same expandable coating composition as obtained in the above processes was coated on a release paper. The release paper was held at 80° C. for 1 hour, and thereby these compounds were reacted and the expandable coating composition was hardened, and a polyurethane film having a thickness of 100 to 150 μm was prepared. After letting it stand for 24 hours, the polyurethane film was cut down and test pieces having a size of 1 cm×10 cm were prepared. Then, after holding them at 20° C. for 5 hours, breaking strength, elongation percentage, and 100% modulous, which is a stress when it is elongated at a ratio of 100% of the test pieces were measured using a universal testing machine TENSILON® RTC-1210 (marketed by Orientic Co., Ltd.). Moreover, the expandable coating composition, which was used for measuring elongation percentage and breaking strength of polyurethane resin film, contained 2.0 g of dibutyltindilaurate, instead of ethylenediamine contained in the expandable coating composition obtained by the above processes. These results are shown in Table 1.

EXAMPLES 2 AND 3

Expanded coating films were prepared in a manner identical to that of Example 1, except that the use polyol compound was changed. Then, elasticity and strength of the obtained expanded coating films and breaking strength and elongation percentage of the obtained polyurethane resins were evaluated in a manner identical to those of Example 1. These results are also shown in Table 1.

COMPARATIVE EXAMPLES 1 TO 3

Comparative expanded coating films were prepared in a manner identical to that of Example 1 of the present invention, except that the polyol compound used was changed. Then, elasticity and strength of the obtained expanded coating films and breaking strength and elongation percentage of the obtained comparative polyurethane resins were evaluated in a manner identical to that of Example 1. These results are shown in Table 1.

TABLE I

| | | Example 1 | Example 2 | Example 3 | Comparative Example 1 | Comparative Example 2 | Comparative Example 3 |
|---|---|---|---|---|---|---|---|
| Expandable coating composition | (a) | 100 | 100 | 100 | 100 | 100 | 100 |
| | (b) | 34.5 | 34.5 | 34.5 | 34.5 | 34.5 | 34.5 |
| | (c) | 0.1 | 0.1 | 0.1 | 0.1 | 0.1 | 0.1 |
| | Sn compound | 0.5 | 0.5 | 0.5 | 0.5 | 0.5 | 0.5 |
| | ED | 0.3 | 0.3 | 0.3 | 0.3 | 0.3 | 0.3 |
| | UB1 | — | — | — | — | — | — |
| | UB2 | — | — | — | — | — | — |
| Properties of polyurethane resin | Elongation percentage (%) | 185 | 370 | 273 | 205 | 7 | 120 |
| | Breaking strength (N/cm$^2$) | 91.3 | 200.5 | 475.8 | 4.6 | 1710.6 | 303.1 |
| | 100% modulous (N/cm$^2$) | 67.1 | 60.5 | 175.4 | 1.4 | — | 240 |

TABLE I-continued

|  |  | Example 1 | Example 2 | Example 3 | Comparative Example 1 | Comparative Example 2 | Comparative Example 3 |
|---|---|---|---|---|---|---|---|
| Evaluation of Expanded coating film | Elasticity | ○ | ○ | ○ | ○ | x | x |
|  | Strength | ○ | ○ | ○ | x | ○ | ○ |

In Table 1, (a) indicates polyol compound, (b) indicates isocyanate compound (diphenylmethandiisocyanate), (c) indicates water, Sn compound is dibutyltindilaurate, ED is ethylene diamine, UB1 is urethane resin beads (trade name: ART PEARL ® C-400; marketed by NEGAMI CHEMICAL INDUSTRIAL CO., LTD.; average particle diameter: 15 μm; specific gravity: 1.2), and UB2 is urethane resin beads (trade name: ART PEARL ® C-200; marketed by NEGAMI CHEMICAL INDUSTRIAL CO., LTD.; average particle diameter: 30 μm; specific gravity: 1.2)

EXAMPLES 4 TO 8

Expanded coating films were prepared in a manner identical to that of Example 1, except that elastic solid particles (trade name: ART PEARL® C-400 and C-200; marketed by NEGAMI CHEMICAL INDUSTRIAL CO., LTD.) were further added. That is, the polyol compound used in the Example 1 was used in these Examples 4 to 8. Then, elasticity and strength of the obtained expanded coating films and breaking strength and elongation percentage of the obtained polyurethane resin were evaluated in a manner identical to that of Example 1. Moreover, in these Examples 4 to 8, whether or not the elastic solid particles transfer to the surface of the expanded coating film is observed. As a result of this observation, no transfer was observed in the expanded coating films obtained in these Examples 4 to 8. These results are shown in Table 2.

TABLE 2

|  |  | Example 4 | Example 5 | Example 6 | Example 7 | Example 8 |
|---|---|---|---|---|---|---|
| Expandable coating composition | (a) | 100 | 100 | 100 | 100 | 100 |
|  | (b) | 34.5 | 34.5 | 34.5 | 34.5 | 34.5 |
|  | (c) | 0.1 | 0.1 | 0.1 | 0.1 | 0.1 |
|  | Sn compound | 0.5 | 0.5 | 0.5 | 0.5 | 0.5 |
|  | ED | 0.3 | 0.3 | 0.3 | 0.3 | 0.3 |
|  | UB1 | 20 | 50 | — | — | — |
|  | UB2 | — | — | 20 | 50 | 100 |
| Properties of polyurethane resin | Elongation percentage (%) | 185 | 185 | 185 | 185 | 185 |
|  | Breaking strength (N/cm$^2$) | 91.3 | 91.3 | 91.3 | 91.3 | 91.3 |
|  | 100% modulous (N/cm$^2$) | 67.1 | 67.1 | 67.1 | 67.1 | 67.1 |
| Evaluation of Expanded coating film | Elasticity | ○ | ○ | ○ | ○ | ○ |
|  | Strength | ○ | ○ | ○ | ○ | ○ |

In Table 2, (a) indicates polyol compound, (b) indicates isocyanate compound (diphenylmethandiisocyanate), (c) indicates water, Sn compound is dibutyltindilaurate, ED is ethylene diamine, UB1 is urethane resin beads (trade name: ART PEARL ® C-400; marketed by NEGAMI CHEMICAL INDUSTRIAL CO., LTD.; average particle diameter: 15 μm; specific gravity: 1.2), and UB2 is urethane resin beads (trade name: ART PEARL ® C-200; marketed by NEGAMI CHEMICAL INDUSTRIAL CO., LTD.; average particle diameter: 30 μm; specific gravity: 1.2)

It is clear from the results of Tables 1 and 2 that the expanded coating films obtained in the Examples contain polyurethane resin, which has a breaking strength of 5 N/cm$^2$ or greater and less than 200 N/cm$^2$ in a case in which an elongation percentage thereof is 100% or less and which has a breaking strength of 5 N/cm$^2$ to 1,500 N/cm$^2$ in a case in which an elongation percentage thereof is more than 100%, have elasticity and a soft feeling, and as well as sufficient strength.

What is claimed is:

1. An expandable coating composition which can produce an expanded coating film and which contains (a) a polyol compound, (b) an isocyanate compound, and (c) water;
    wherein the (a) polyol compound reacts with a part of the (b) isocyanate compound, thereby yielding polyurethane resin;
    the remaining (b) isocyanate compound reacts with the (c) water, thereby yielding carbon dioxide;
    the polyurethane resin has a breaking strength of 5 N/cm$^2$ or greater and less than 200 N/cm$^2$ in a case in which an elongation percentage thereof is 100% or less;
    the polyurethane resin has a breaking strength of 5 N/cm$^2$ to 1,500 N/cm$^2$ a case in which an elongation percentage thereof is more than 100%; and
    the expandable coating composition contains elastic solid particles.

2. A coated product comprising an expanded coating film obtained from the expandable coating composition according to claim 1.

3. A production method for an expanded coating film comprising the steps of:
    coating an expandable coating composition containing (a) a polyol compound, (b) an isocyanate compound, (c) water, and elastic solid particles;

reacting the (a) polyol compound with a part of the (b) isocyanate compound, thereby yielding polyurethane resin, the polyurethane resin has a breaking strength of 5 N/cm$^2$ or greater and less than 200 N/cm$^2$ in a case in which an elongation percentage thereof is 100% or less and the polyurethane resin has a breaking strength of 5 N/cm$^2$ to 1,500 N/cm$^2$ in a case in which an elongation percentage thereof is more than 100%;

reacting the remaining (b) isocyanate compound with the (c) water, thereby yielding carbon dioxide.

4. An expandable coating composition according to claim 1, wherein the expandable coating composition produces a final expanded coating film having a thickness of 0.5 to 5 mm.

5. A coated product according to claim 2, wherein the coated product has a thickness of 0.5 to 5 mm.

6. A production method for an expanded coating film according to claim 3, wherein the expandable coating composition produces a final expanded coating film having a thickness of 0.5 to 5 mm.

* * * * *